US011057293B2

(12) United States Patent
Aguado Martín et al.

(10) Patent No.: US 11,057,293 B2
(45) Date of Patent: Jul. 6, 2021

(54) METHOD AND SYSTEM FOR VALIDATING ORDERED PROOF OF TRANSIT OF TRAFFIC PACKETS IN A NETWORK

(71) Applicant: Telefónica, S.A, Madrid (ES)

(72) Inventors: Alejandro Aguado Martín, Boadilla del Monte (ES); Vicente Martín Ayuso, Boadilla del Monte (ES); Diego R. López, Madrid (ES); Antonio Pastor Perales, Madrid (ES); Victor López Alvarez, Madrid (ES)

(73) Assignee: Telefónica, S.A, Madrid (ES)

( * ) Notice: Subject to any disclaimer, the term of this patent is extended or adjusted under 35 U.S.C. 154(b) by 0 days.

(21) Appl. No.: 16/278,111

(22) Filed: Feb. 17, 2019

(65) Prior Publication Data
US 2019/0260667 A1    Aug. 22, 2019

(30) Foreign Application Priority Data

Feb. 19, 2018   (EP) ..................................... 18382095

(51) Int. Cl.
*H04L 12/755*    (2013.01)
*H04L 9/08*    (2006.01)
(Continued)

(52) U.S. Cl.
CPC .......... *H04L 45/021* (2013.01); *H04L 9/0656* (2013.01); *H04L 9/085* (2013.01);
(Continued)

(58) Field of Classification Search
CPC ..... H04L 45/021; H04L 45/64; H04L 9/0656; H04L 9/0825; H04L 9/085; H04L 69/22
See application file for complete search history.

(56) References Cited

U.S. PATENT DOCUMENTS 9,703,965 B1 * 7/2017 Robinson ............ H04L 63/0428
10,582,027 B2 * 3/2020 Bhandari ............ H04L 67/2804
(Continued)

OTHER PUBLICATIONS

European Search Report and the European Search Opinion dated Jul. 18, 2018 From the European Patent Office Re. Application No. 18382095.0. (8 Pages).
(Continued)

*Primary Examiner* — Blake J Rubin (57) ABSTRACT

A system and method for validating proof of transit of network traffic through network nodes (N), the node (N) comprising a set of input interfaces (20) receiving incoming packets, a first module (A) to identify a matching route within a routing table (23) and storing means (22) to provide next modules (B, C, D) with two private keys if the packet is matched and/or the packet metadata includes OPoT information. The second module (B) decrypts the OPoT metadata using the first private key associated to the link of the node from which the incoming packets are received. The node (N) has SSS metadata to be processed by a third module (C) for the correct generation of cumulative validation parameters. When the SSS process is finished by the third module (C), the fourth module (D) re-encrypts the OPoT metadata using the second private key before packet forwarding to the subsequent node in the path through output interfaces (21).

4 Claims, 3 Drawing Sheets

(51) Int. Cl.
  *H04L 12/715* (2013.01)
  *H04L 29/06* (2006.01)
  *H04L 9/06* (2006.01)

(52) U.S. Cl.
  CPC ............ *H04L 9/0825* (2013.01); *H04L 45/64* (2013.01); *H04L 69/22* (2013.01)

(56) References Cited

U.S. PATENT DOCUMENTS

| | | |
|---|---|---|
| 2009/0103734 A1 | 4/2009 | Hammell et al. |
| 2012/0144186 A1* | 6/2012 | Puiggali Allepuz ........................ H04L 9/3013 713/150 |
| 2014/0198791 A1 | 7/2014 | Lim |
| 2016/0315819 A1 | 10/2016 | Dara et al. |
| 2016/0315921 A1* | 10/2016 | Dara ....................... H04L 41/28 |
| 2017/0111209 A1* | 4/2017 | Ward ..................... H04L 43/024 |
| 2018/0063018 A1* | 3/2018 | Bosch ................... H04L 45/306 |
| 2018/0278548 A1* | 9/2018 | Pignataro ................ H04L 43/18 |
| 2019/0014036 A1* | 1/2019 | Anand ................. H04J 14/0267 |
| 2019/0014394 A1* | 1/2019 | Anand .................. H04L 9/3242 |
| 2019/0068495 A1* | 2/2019 | Jeuk .................... H04L 41/5041 |
| 2019/0182103 A1* | 6/2019 | Pignataro ................ H04L 45/22 |
| 2019/0327109 A1* | 10/2019 | Guichard ............ H04L 12/4604 |
| 2020/0076727 A1* | 3/2020 | Filsfils ..................... H04L 45/34 |
| 2020/0084147 A1* | 3/2020 | Gandhi ................... H04L 45/70 |
| 2020/0244582 A1* | 7/2020 | Li .......................... H04L 45/20 |

OTHER PUBLICATIONS

Brockners et al. "Proof of Transit (Draft-Brockners--Proof-of-Transit-01)", Network Working Group, XP055491253, Internet-Draft, p. 1-20, Jul. 18, 2016.

* cited by examiner

METHOD AND SYSTEM FOR VALIDATING ORDERED PROOF OF TRANSIT OF TRAFFIC PACKETS IN A NETWORK

RELATED APPLICATION

This application claims the benefit of priority of European Patent Application No. 18382095.0 filed on Feb. 19, 2018, the contents of which are incorporated herein by reference in their entirety.

FIELD AND BACKGROUND OF THE INVENTION

The present invention has its application within the telecommunication sector, more specifically, relates to proof of transit for validating a packet has passed through a path in a network.

More particularly, the present invention refers to a method and a system providing ordered proof-of-transit (OPoT) for packets forwarded across a path in a network.

The current trend to build network services implies their deployment through dynamically allocated forwarding entities which usually form opaque tunnels providing end-to-end connectivity. These paths (configured either with centralized controllers or self-managed by network nodes or network management systems) do not hold verification techniques to check if the traffic is forwarded in order across a verified route. Moreover, with the advent of network virtualization techniques, the verification of the correct packet forwarding across a virtualized infrastructure has become a must, not only for security reasons, but also for legal or other purposes.

Several technologies such as Traffic Engineering (TE), Service Function Chaining (SFC), and policy based routing are used to steer traffic through a specific, user-defined path.

Technological areas comprising Software-Defined Networking (SDN), Network Function Virtualization (NFV), Software-Defined WAN, universal CPE (uCPE) and cloud-VPN demand methods to guarantee the realization of the specified traffic paths.

The Internet-Draft "Proof of Transit—draft-brockners-proof-of-transit-04" issued on Oct. 30, 2017, by the Internet Engineering Task Force (IETF) describes defines mechanisms to securely prove that traffic transited a defined path. These mechanisms allow to securely verify whether, within the given path, all packets traversed all the nodes that they are supposed to visit. This IETF Draft proposes a double (two polynomials) scheme based on Shamir's Secret Sharing (SSS) technique, applied to the network for validating that specific flows/traffic passes through a set of nodes in a network (Proof of Transit). The key idea of SSS is to distribute a secret in different shares to the nodes included in the path. Each node reconstructs/grows the secret using its share and Lagrange polynomials, finally getting the desired value (the secret, i.e. the polynomial constant coefficient) as it reaches the egress node of the path. This solution is enhanced to support multiple packets by using two polynomials, one of them secret and the other public (the one used to calculate the secret) and randomized per packet.

US2016/0315921A1 and US2016/0315819A1 encloses two different techniques: the first one utilizes nested or cumulative encryption to grown certain information while it reaches the verification node, while the second is the same as described by the aforementioned IETF draft. US2016/0315921A1 uses cumulative encryption, which requires the different nodes to hold secret keys (distributed from a central key server), a random number generated in the ingress node, and sequence number or timestamp which is encrypted and combined with the verification value. Upon receipt on the egress node, it reconstructs the same value, as it holds every key of the intermediate nodes. The combination of the encryption result and the verification value is done via Exclusive OR (XOR), while any encryption or hashing value can be used for this scheme. As the combination of every encryption result is done via XOR (commutative operation), this solution is not order dependent (the verifier may construct the validation in any desired order, as in SSS) but also it does not check the order during the proof-of-transit. US2016/0315819A1 describes methods for verifying proof of transit of network traffic through a plurality of network nodes in a network. Verification information is read from in-band metadata of the packet. Updated verification information is generated from the verification information read from the packet and based on configuration information associated with the network node. The updated verification information is written back to the in-band metadata in the packet and the packet is forwarded from the network node in the network.

The current solution specified by the aforementioned IETF Draft introduces a second polynomial to the SSS scheme in order improve the reusability of the solution for a traffic flow, but this approach brings certain vulnerability issues. In this sense, a passive attacker could tap the traffic in the intermediate links (one or multiple) of the path, store the packet's metadata and use it to calculate information such as the Lagrange polynomial constant coefficients and the polynomial's primer number used by the SSS, and with that information, reproduce the verification value and bypass any node in the network. More particularly, it is shown here below how this technique can be tricked by gathering few packets (either across every hop, or even before and after a single node):

Initially, let's assume that two packets, packet$^1$ and packet$^2$, can be gathered just after the first node in the path. Let $f_1(x_i)$ be the result of a first polynomial for a point $x_i$ assigned to the node "i", node$_i$, of the path. Let $f_2(x_i)$ be the result of a second polynomial without the constant coefficient. Then let RND$^j$ be the constant part of the second polynomial for a given packet$^j$ and CML$_i^j$ be the cumulative value for the packet$^j$ after traversing the node$_i$. LPC stands for Lagrange Polynomial Constant and LPC$_i$ denotes the Lagrange basis polynomial constant for the point $x_i$. Both $x_i$ and LPC$_i$ must be kept secret. Then, by capturing two packets:

$$CML_1^1 = (f_1(x_1) + f_2(x_1) + RND^1) * LPC_1 (\text{mod } p)$$

$$CML_1^2 = (f_1(x_1) + f_2(x_1) + RND^2) * LPC_1 (\text{mod } p)$$

$$\Rightarrow CML_1^1 - CML_1^2 (\text{mod } p) = (RND^1 - RND^2) * LPC_1 (\text{mod } p)$$

$$\Rightarrow LPC_1 = \frac{CML_1^1 - CML_1^2}{RND^1 - RND^2} (\text{mod } p)$$

For a given node$_i$ the result will be:

$$CML_i^1 = (f_1(x_i) + f_2(x_i) + RND^1) * LPC_i + CML_{i-1}^1 (\text{mod } p)$$

$$CML_i^2 = (f_1(x_i) + f_2(x_i) + RND^2) * LPC_1 + CML_{i-1}^2 (\text{mod } p)$$

$$\Rightarrow (CML_i^1 - CML_{i-1}^1) - (CML_i^2 - CML_{i-1}^2)(\text{mod } p) =$$

-continued $$\Rightarrow LPC_i^{\{1,2\}} = \frac{(CML_i^1 - CML_{\{i-1\}}^1) - (CML_i^2 - CML_{\{i-1\}}^2)}{RND^1 - RND^2}(RND^1 - RND^2)*LPC_1(\bmod p)$$

where $$\Rightarrow LPC_i^{\{1,2\}} = \frac{(CML_i^1 - CML_{\{i-1\}}^2) - (CML_i^2 - CML_{\{i-1\}}^2)}{RND^1 - RND^2}(\bmod p)$$

denotes the value of $LPC_i$ generated respectively by packet[1] and packet[2]. The $LPC_i$ value must be unique, but the number prime p used for the module operation is still unknown, making its calculation harder. Tracing eleven packets, up to 10! combinations of $LPC_i^{\{y,z\}}$ could be generated and, out of all of them, only the values of $LPC_i^{\{y,z\}} \in \mathbb{Z}$ are eligible. If l, $2<l<10!$ is the number of $LPC_i^{\{y,z\}} \in \mathbb{Z}$, then (l-1)! combinations of $LPC_i^{\{y,z\}}$ could be calculated as:

$$LPC_i^{\{y,z\}} = LPC_i + m^{\{y,z\}} * p, m^{\{y,z\}} \in \mathbb{Z}$$

$$LPC_i^{\{v,w\}} = LPC_i + m^{\{v,w\}} * p, m^{\{v,w\}} \in \mathbb{Z}$$

$$LPC_i^{\{y,z\}} - LPC_i^{\{v,w\}} = (m^{\{y,z\}} - m^{\{v,w\}}) * p$$

And then the following set, from which the prime p could be derived, is calculated:

$$\{(m^{\{1,2\}} - m^{\{1,3\}})*p, \quad \ldots \quad ,(m^{\{1,4\}} - m^{\{3,7\}})*p, \ldots\}, (m^{\{k,l\}} - m^{\{r,s\}}) \in \mathbb{Z}$$

Let's assume that the prime p is obtained from the previous calculated set. The values of $CML_i^j$ and $RND_i$ are public (are openly encapsulated in the packet metadata). Therefore, assuming the traffic could be tampered at any point (and p has been obtained), for a given setup of the Proof of Transit (PoT), the set $\{LPC_1, \ldots, LPC_{\{n-1\}}\}$ could be calculated by tracing two different packets (and their PoT metadata).

Let's now assume that a third packet packet[3] traverses the network. Let's check if, by knowing $RND_3$, the $CML_3^j$ values could be calculated. Firstly, even when this cannot be logically done (the calculation of the random constant is done internally in the first node), $CML_3^1$ is calculated as follows:

$$CML_1^1 = (f_1(x_1) + f_2(x_1) + RND^1) * LPC_1$$

$$\Rightarrow (f_1(x_1) + f_2(x_1)) * LPC_1 = CML_1^1 - (RND^1 * LPC_1)$$

$$CML_1^3 = (f_1(x_1) + f_2(x_1) + RND^3) * LPC_1 =$$

$$(f_1(x_1) + f_2(x_1)) * LPC_1 + RND^3 * LPC_1 =$$

$$CML_1^1 - (RND^1 * LPC_1) + RND^3 * LPC_1 =$$

$$CML_1^1 + (RND^3 - RND^1) * LPC_1$$

For a given $node_i$ the result will be:

$$(f_1(x_i) + f_2(x_i)) * LPC_i = CML_i^1 - CML_{\{i-1\}}^1 - (RND^1 * LPC_i)$$

$$CML_i^3 = (f_1(x_i) + f_2(x_i) + RND^3) * LPC_i + CML_{\{i-1\}}^3 =$$

$$(f_1(x_i) + f_2(x_i)) * LPC_i + RND^3 * LPC_i + CML_{\{i-1\}}^3 =$$

$$CML_i^1 - CML_{\{i-1\}}^1 - (RND^1 * LPC_i) + RND^3 * LPC_i + CML_{\{i-1\}}^3 =$$

$$CML_i^1 - CML_{\{i-1\}}^1 + (RND^3 - RND^1) * LPC_i + CML_{\{i-1\}}^3$$

Then, by tracing packets before and after a single network $node_i$, that node "i" of the PoT path could be bypassed by getting the packet, and calculating the corresponding $CML_i^{\{new-packet\}}$. If the information is gathered at each hop of the path, the secret could also be grown up to the n−1 hop by getting the packet at the first node, bypassing the whole path.

For example, for the second node, $node_2$, after retrieving the packet at the first hop:

$$CML_2^3 = (f_1(x_2) + f_2(x_2) + RND^3) * LPC_2 + CML_1^3 =$$

$$(f_1(x_2) + f_2(x_2)) * LPC_2 + RND^3 * LPC_2 + CML_1^3 =$$

$$CML_2^1 - CML_1^1 - (RND^1 * LPC_2) + RND^3 * LPC_2 + CML_1^3 =$$

$$CML_2^1 - CML_1^1 + (RND^3 - RND^1) * LPC_2 + CML_1^3$$

where all the values are know, and $CML_2^3$ can be generated and therefore, the third node, $node_3$, can be bypassed.

This demonstration could be then grown for any node "i" of the path. These operations are done mod (p) and this assumes that the prime p can be disclosed as initially shown. A statistical analysis could be also done to check how many packets must be gathered to get that set big enough for the attack.

Summarizing, here are several problems in prior-art solutions:

The current solutions validate that certain traffic has traversed a set of nodes, but not in which order.

The solution based on SSS (the aforementioned IETF draft) has not been demonstrated yet to be secure, as explained before.

The solutions based on encryption (US2016/0315921A1 and US2016/0315819A1) may be computationally costly. They also require a central key server and a verification node hosting every single key of the involved nodes (intermediate and ingress), making both entities single failure points and a potential security risk.

Therefore, there is a need in the state of the art for providing computationally lighter proof of transit to validate that certain packets traverse a specified path of nodes in a required order.

SUMMARY OF THE INVENTION

The present invention solves the aforementioned problems and overcomes previously explained state-of-art work limitations by providing ordered proof-of-transit (OPoT) for packets traversing a specific path across a network infrastructure.

Furthermore, the present invention can use different key exchange technologies together with symmetric encryption algorithms to secure and provide order to secret sharing schemes.

Areas of application of the present invention includes security, Quality of Sevice (QoS), service assurance, and network management in the access and transport segments, as well as in datacenters.

An aspect of the present invention refers to a method for validating ordered proof-of-transit (OPoT) of traffic packets in a network, which comprises the following steps:

receiving at least a packet through a path, the path comprising multiple network nodes starting from an ingress node and finishing at an egress node, the packet comprising a header containing metadata and being sent from a previous network node within the path;

identifying a matching route for the received packet with a routing table and identifying proof of transit metadata in the header of the received packet;

if the matching route for the received packet is identified and, if the identified matching route is associated with proof of transit metadata and proof of transit metadata is identified in the header of the received packet, providing a first private key associated with the network node and the previous network node of the matching route in the path and decrypting the proof of transit metadata by using the provided first private key.

At the ingress node of the path, the method further comprises generating the proof of transit metadata to be included in the header of the received packet. According to an embodiment of the invention, the proof of transit metadata is then updated by each network node of the path until reaching the egress node.

At the egress node, if the packet has traversed the path, the method further comprises verifying the proof of transit metadata and, if so, removing all the proof of transit metadata from the header before forwarding the packet by the egress node; otherwise the packet is dropped by the egress node.

At another network node of the path, which is neither the ingress node nor the egress node, the method further comprises re-encrypting the proof of transit metadata by using a second private key, before forwarding the packet with the header (the header including the re-encrypted proof of transit metadata) from the network node to a subsequent network node of the matching route in the path.

Another aspect of the present invention refers to a system configured to implement the OPoT validation method described before by comprising a plurality of network nodes assignable to a path, the path starting from an ingress node and finishing at an egress node, each network node comprising the following components or modules:

a first module configured to identify a matching route for the received packet with a routing table and to identify proof of transit metadata in the header of the received packet;

a second module connected to the first module and configured to, if the matching route for the received packet is identified and the identified matching route is associated with proof of transit metadata and proof of transit metadata is identified in the header of the received packet, decrypt the proof of transit metadata by using a first private key; the first private key being associated with the network node and the previous network node of the matching route in the path and being provided by storing means of the network node Additionally, according to an embodiment of the invention, a network node of the system further comprises a third module connected to the second module and configured, if the network node is the ingress node of the path, to generate proof of transit metadata to be included in the header of the received packet; and, for any node, to update the proof of transit metadata using unique information hosted per each node.

Each network node of the system different from the egress node further comprises a fourth module connected to the third module and configured to re-encrypt the proof of transit metadata by using a second private key, before forwarding the packet to a subsequent network node of the matching route in the path. The packet is forwarded by means of a set of output interfaces of the node, the packet comprising a header which includes the re-encrypted proof of transit metadata. The second private key associated with said network node and the subsequent network node of the matching route is provided by the storing means of the network node.

The method and system in accordance with the above described aspects of the invention has a number of advantages with respect to prior art, which can be summarized as follows:

The present invention respects order, as any shuffling in the traversed nodes will cause invalid cumulative values, leading to an easy identification by the egress node.

The present invention is computationally lighter than any nested encryption, as it only involves XOR, sums, multiplication and modulo operations.

Increases the security of the SSS-based solution proposed by the IETF, as it encrypts/secures the values that can be used to attach the Random Number (RND) and Cumulative (CML) scheme.

Assuming that the random number generated in the ingress node is truly random, the key associated to each hop could be reused for a large number of packets, as the random value (and the generated cumulative value) will virtually act as a private key.

The key refresh value (number of packets per key) is also associated to the Levels of Assurance (LoA) of the path, moving from the size of the prime number down to one key per packet or One Time Pad (OTP).

Each link of the path generates independently (and in offline mode) a key store which is filled using different techniques, associated to different LoA, such as post-quantum cryptography (PQC), quantum key distribution (QKD) or conventional key exchange techniques. There is no need for a central key server (unlike US2016/0315921A1 and US2016/0315819A1) and the present invention integrates with network paradigms, such as SDN (Software-Defined Network).

Different techniques providing multiple LoA can be defined per path (service) or even per link in a path, considering security areas to be traversed by the traffic.

The proposed scheme could also be part of a longer service, where a subset of the included nodes requires the OPoT verification (while other intermediate nodes ignore and do not manipulate any OPoT metadata).

These and other advantages will be apparent in the light of the detailed description of the invention.

BRIEF DESCRIPTION OF THE SEVERAL VIEW OF THE DRAWINGS

For the purpose of aiding the understanding of the characteristics of the invention, according to a preferred practical embodiment thereof and in order to complement this description, the following Figures are attached as an integral part thereof, having an illustrative and non-limiting character.

DESCRIPTION OF SPECIFIC EMBODIMENTS OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Different embodiments or additional features for the present invention are defined to provide different levels of assurance, LoA, since different security parameters affect the quality of the Proof of Transit, PoT, when a session/service/path, is deployed. These parameters are:

Key length: The length of the used key (also described as the size of the prime used for the SSS scheme) impacts the amount of packets that can be validated by the SSS scheme. The bigger the length, the more packets can be checked using a single SSS scheme. But this size also affects the payload of the associated packets, so this penalty should be considered together with the bandwidth of the service.

Key exchange technology: The quality of the keys used to secure the SSS values depends on the technology used for their generation. The present invention is valid for any change in current standards (e.g. deprecation of conventional key exchange techniques, adoption of new technologies on this area), and able to switch between different technologies on demand. Any technology could be chosen for the whole path, or even defined per link, depending on the predefined LoA (different levels of LoA per link/path can be considered). Currently, three main groups of key sources are considered here:

Conventional algorithms: Either for key generation (e.g. Diffie-Hellman) or key transport (e.g. RSA), conventional algorithms are the base for the key agreement for each link.

Post-quantum algorithms: There have been developments in order to tackle current security threats due to the advances on quantum computing. Such algorithms (so called post-quantum) are still to be demonstrated to be safe enough against this type of attacks, but still suitable source for securing the PoT.

Quantum key distribution, QKD: Similarly to post-quantum techniques, this solution was developed to solve security threats associated to advances in quantum computing (e.g. Shor's algorithm).

Refresh rate: The number of packets on which a key is used to secure the SSS scheme. This ratio (in packets per key, ppk) is configured from the maximum value (the size of the prime in the SSS scheme) to the minimum (one packet per key or One Time Pad: OTP). The rate could be also specified per link of a given path, or have a single rate defined for the entire path, based on security considerations.

Encrypted information: The amount of information to be kept secret. It allows to specify whether the CML is encrypted, or if RND and CML are both encrypted. Encrypting both values will allow the reuse of the same SSS scheme, if the keys are properly refreshed.

Timestamping: In other embodiment, a timestamp is set and checked by the nodes in the path, to verify that a packet does not delay (is not redirected) between two nodes in the path.

Figure 1:
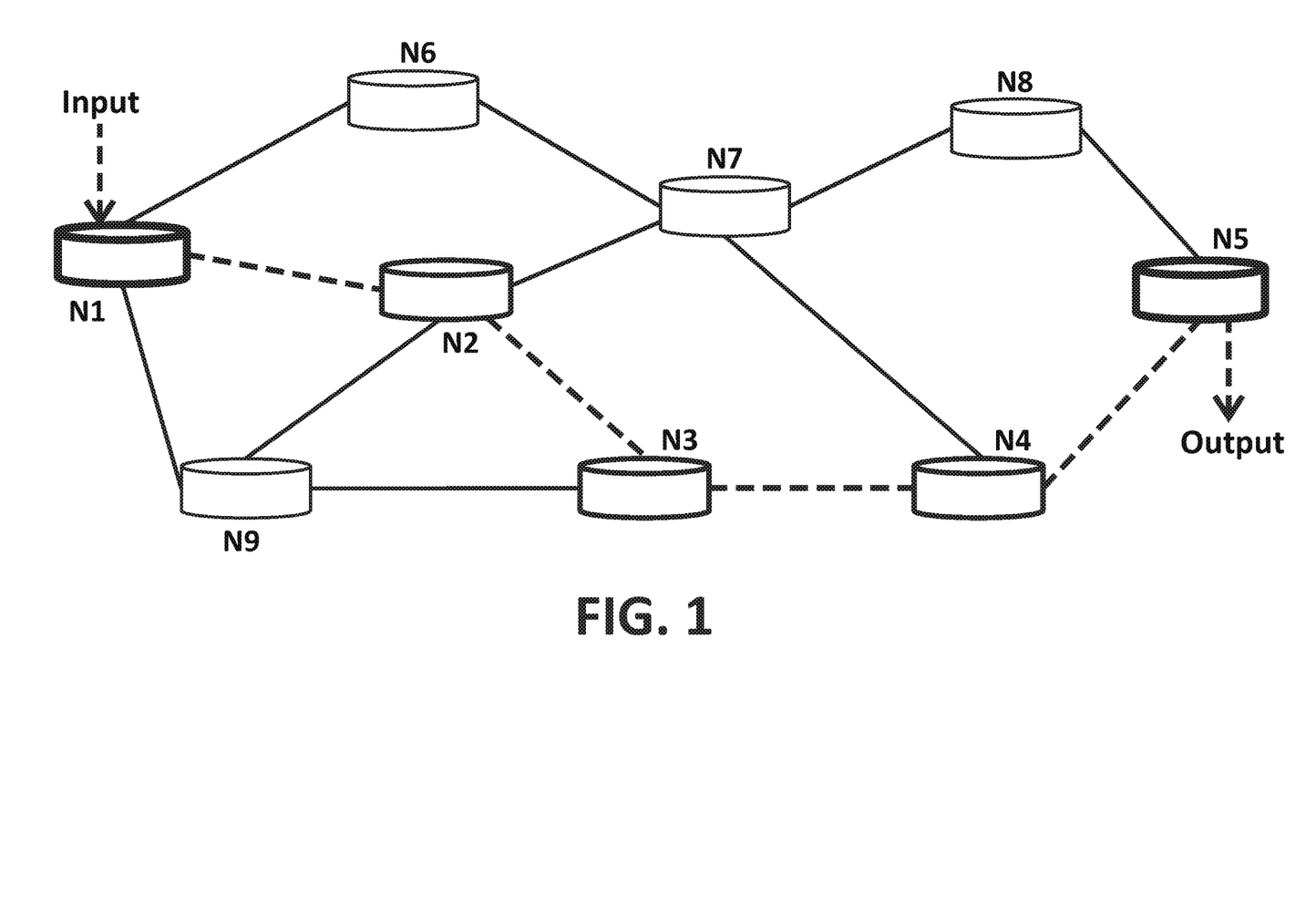
FIG. 1 shows a set of nodes composing a network in which OPoT is configured, according to a possible application scenario of the invention.

FIG. 1 presents a system composed by multiple network nodes (N1, N2, . . . , N9), wherein a network path, associated with a network service, is composed by a set of connected nodes (N1, N2, N3, N4, N5) and their associated links, depicted by dashed lines in FIG. 1. The system validates network traffic packets traversing a plurality of network nodes forming a path by means of a proposed ordered proof of transit, OPoT, mechanism which combines a cumulative technique with low overhead computing encryption techniques to provide a secured secret sharing scheme. Despite FIG. 1 shows direct connections between each pair of nodes within the path, any link could enclose other network nodes not included in the OPoT scheme, being the OPoT path a subset of a longer service. The first node (N1) of the path acts as the ingress node, which initiates the OPoT process; while the last node (N5) is the egress node and the final validator of the OPoT mechanism. The first node (N1) and the last node (N5) are connected through intermediate nodes (N2, N3, N4) along the path.

Each node involved in the OPoT process is capable of:

Securely generating pools of symmetric keys with other network peers and storing the generated private keys associated with each node to which there is an existing direct connection, either logical or physical, within the network.

Reading network packets and accessing their metadata.

Performing XOR operations of the packet header parameters—metadata—and private keys from the node key store to secure/stamp and decipher the OPoT metadata.

Performing fast sum, multiplication and module operations over numerical parameters extracted from the packet header for secret growing purposes.

Generating secure random numbers for each packet to be verified (at the ingress node).

Modifying, based on the output of the different operations described above, each packet metadata with an updated value for OPoT verification.

Forwarding the processed packets to other nodes in the network.

Communicating with the network's control plane to allow OPoT configuration (required SSS data, prior and next nodes in the path, other flow matching information).

Providing secure configuration channels for OPoT service configuration, either with a central entity, e.g., an SDN controller, or with a system administrator.

Each node involved in the OPoT process is communicated with a central management instance capable of:

Configuring each node within the OPoT path.

Accepting requests for new OPoT services.

Calculating SSS schemes and refreshing the scheme, when required.

Figure 2:
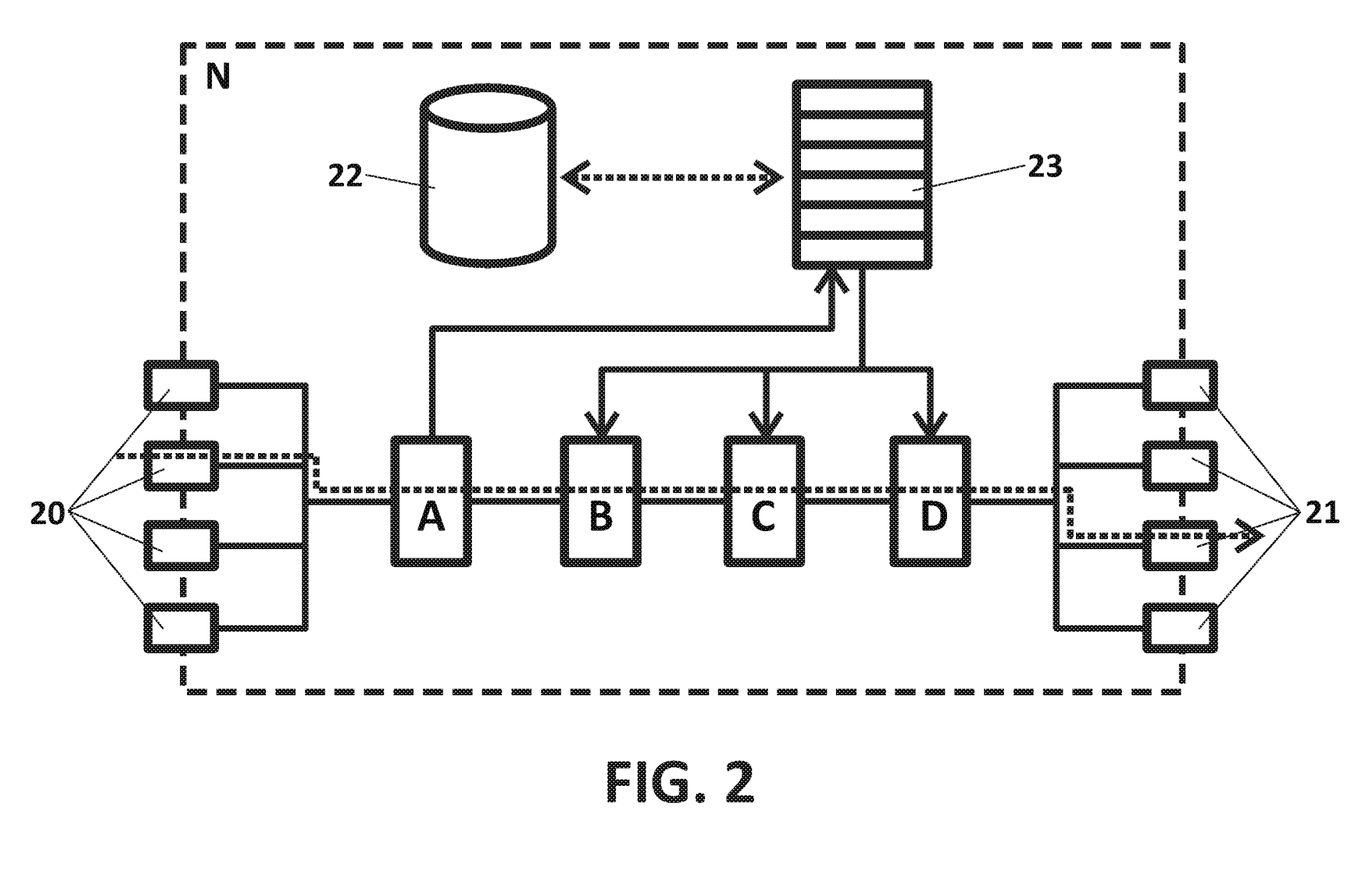
FIG. 2 shows an internal pipeline architecture of a network node performing OPoT, according to a preferred embodiment of the invention.

More specifically, FIG. 2 shows an example of the internal pipeline of a node (N) involved in the OPoT, depicted as a state box. At the initial stage, the node (N) comprises a set of input interfaces (20) receiving incoming packets. The headers of the incoming packets are initially processed by an ingress module, a first module (A) in order to identify a matching flow/route within a flow/routing table (23). If the packet is matched and the action, or the packet metadata, includes OPoT information, two private keys are provided from storing means (22) of the node (N) to next modules: a second module (B) for decrypting the OPoT metadata and a fourth module (D), the last—egress-one, for re-encrypting the OPoT metadata before packet forwarding to the next/subsequent node in the path. The OPoT metadata of the incoming packets are decrypted by the second module (B) using the first private key, which associated to the link of the node from which the incoming packets are received. The node (N) has SSS metadata to be processed by a third module (C) for the correct generation of the cumulative validation parameters. When the SSS process is finished by the third module (C), the fourth module (D) secures the metadata by re-encryption using the second private key provided for the next/subsequent link to the subsequent node in the OpoT path. The node (N) forwards the packet with the re-encrypted OPoT metadata through its set of output interfaces (21).

The ingress and egress nodes act in a slightly different manner:

In the ingress node, the first and last modules (A, D) work in a similar way as described before; while the second module (B) does not exist, and the third module (C) is in charge of creating the SSS metadata in the OPoT headers and randomly generating the random polynomial secret for each packet, as well as producing the necessary data for the initial verification as explained above.

In the egress node, the first and second modules (A, B) are used respectively to identify and decipher the OPoT data, while the third module (C) updates and also verifies the metadata. This third module (C) checks the cumulatively generated data to verify if the packet has traversed the specified path. Before leaving, the third module (C) removes any OPoT metadata from the packet headers, as no OPoT metadata will be used anymore once the packet has traversed the path. The fourth module (D) is not necessary at the egress node as the packet leaves the OPoT path.

In FIG. 2, even when this is not a must, the logical representation of the entity in charge of the OPoT is the routing table (23). This routing table (23) can be implemented inside the network node as an internal core, an embedded agent or even can be an external entity (with the associated throughput and latency penalties that this may involve).

The first module (A) performs the ingress step with the required packet identification but the fundamental steps involved in the proposed OPoT are the ones implemented by the remaining modules (B, C, D) which involve two different techniques: i) a cumulative secret sharing scheme, based on a modified SSS, which allows to verify that all nodes have "signed" the packet, and ii) symmetric encryption of the SSS parameters to guarantee the security/secrecy of the solution (no intermediate attacker could learn from the packets without knowing the private keys) and to provide order to the solution (it could verify that all nodes have been traversed and in which order). Both techniques, together with their backgrounds, strengths and vulnerabilities, are explained below.

i) Secret Sharing Scheme: Shamir's Secret Sharing

A secret sharing scheme consists on a main secret which is split and shared among different parties and which can be reconstruct only if all parties use their shares. If only one of the parties is not involved in the reconstruction/growing process, the final secret achieved will not be the original one and, therefore, the process will fail. Applied to networking and, more specifically, to validate the packets' transit across the infrastructure, the secret is something hosted at the verifier, while the, unique, shares of the secret are distributed across the involved nodes. Upon packet reception, each node must reconstruct with its share a part of the secret that will finally reach the verification—egress—node. If any intermediate node is bypassed or other entity modifies the cumulative verification value, the final secret will not be reconstructed as it should and, in consequence, the packet will be marked as failed.

One popular secret sharing scheme is Shamir's Secret Sharing (SSS), which is based on Adi Shamir's threshold scheme. Its mathematical idea is that to build a polynomial of degree n, n+1 points are required. In this sense, the secret to be shared among "n+1" parties is the "n" degree polynomial, and "n+1" points required to reconstruct the polynomial are the shares of the secret to be distributed to the involved nodes. More specifically, the secret to be reconstructed by the nodes is the constant term of the polynomial. It is important to note that the secret itself (polynomial's constant coefficient: pcc) has no meaning and, as such, it can be dynamically defined as it is required. What is meaningful in the scheme, and more specifically for the proof-of-transit case, is the reconstruction process performed by the nodes in the path. This makes the polynomial secret flexible enough to be updated or changed on demand, based on the traffic restrictions.

In this sense, a management entity (e.g. an SDN controller, NMS, system administrator), which is also in charge of configuring the route/path, can:

a) Choose a prime number: p
b) Generate a polynomial (over a finite field of the size of the prime) based on the number of hops to be validated
c) Assign a point $x_i$ to each node "i" in the path
d) Calculate the result of each point $x_i$ using the polynomial $y_i$=Pol ($x_i$), where Pol ( ) is the polynomial function and $y_i$ denotes the calculated result for point $x_i$
e) Calculate and provide the constant coefficient of each partial reconstruction of the polynomial using Lagrange polynomial constant coefficient, lcc, for each point $x_i$:

$$lcc_i = \prod_{\substack{m=0 \\ m \neq i}}^{n+1} \frac{x_m}{x_m - x_i}$$

f) Distribute the SSS data to each point $x_i$, this information including: $x_i$, $y_i$, $lcc_i$ and p. Furthermore, the verification egress node also hosts the secret, i.e., the polynomial's constant coefficient pcc, to verify the correct transit of the data.

Every node within the network receives a cumulative verification value, cmv, which is initially created and set to 0 by the ingress node, and updates the value for the reconstruction of the polynomial's constant coefficient pcc. This updated value is calculated at each node, using the Lagrange polynomial constant coefficient lcc and the polynomial $y_i$=Pol $(x_i)$, following the Lagrange polynomial interpolation. In this way, every value calculated at each node is represented by $cmv_i$=pcc==$\Sigma_{i=0}^{n+1} y_i \times lcc_i + cmv_{i-1}$, being the final verification check:

$$pcc == \sum_{i=0}^{n+1} y_i \times lcc_i$$

If this final check is true, the SSS scheme has succeeded and the packet has passed through all the nodes within the path.

An execution example for a four-nodes n1-n2-n3-n4 path is as follows:
Choose the prime number, p=71, and a polynomial, e.g., $61x^3+55x^2+10x+63$
The nodes are given the values $\{x_i, y_i, lcc_i, p\}$
n1: {39, 59, 45, 71}
n2: {96, 61, 10, 71}
n3: {36, 45, 30, 71}
n4: {68, 17, 58, 71}
plus the additional verification value: pcc=63.

With these values, a specific packet in the network is received in the ingress node. It includes additional metadata to the packet, initially set as zero. When this packet traverses each node, the cmv value is updated as follows:
$cmv_1$=59×45 mod(71)=28
$cmv_2$=61×10+28 mod(71)=70
$cmv_3$=45×30+70 mod(71)=0
$cmv_4$=17×58+63 mod(71)=63

As the calculated value at the verification egress node is the same as the verification value, i.e., $cmv_4$=pcc=63, the egress node verifies that all nodes have manipulated the SSS metadata and, therefore, the path is correctly checked.

Nonetheless, this SSS process has clear limitations:
The first one is associated to the path's order. Shamir's Secret Sharing simply verifies that a set of nodes have participated in the forwarding process, but not in which order. This is key when speaking about network service function chains (the order in the chain must be respected), as well as to verify any switching/routing technique, such as solutions based on residue number systems, segment routing or other traditional approaches.
The second limitation is that this scheme, as presented above, is useful when it is used for a single execution (a single packet). If a second packet is intended to be followed, the SSS scheme should be modified for each packet, which is not realistic for nowadays services' throughput. Otherwise, the packets' metadata could be easily learnt and modified for new incoming traffic.

Unlike the prior art solution proposed by the cited IETF draft "Proof of Transit" that introduces a second polynomial to improve the SSS scheme, the present OPoT solution includes (but is not restricted to) only a single polynomial. This polynomial and the prime number are generated by the management system as described above, but without producing the secret or verification value pcc. This secret is generated by the ingress node randomly and per packet. Each node has the points of the polynomial without constant coefficient, the prime number p and the lcc values. Both the random polynomial's secret, rps, and the cumulative verification, cmv, values are transmitted together in the packet's metadata, and are finally used for the secret reconstruction. Therefore, this polynomial is used in the exact same way as in the SSS scheme for packet verification, but is modified for each incoming packet in the traffic flow adding the secret to the nodes point $y_i$, i.e.,
$cmv_i = (y_i + rps_j) \times lcc_i + cmv_{i-1}$ where $rps_j$ is the random value for a packet "j", $packet^j$.

In order to avoid a passive attacker to learn critical information of the polynomial and reproduce the SSS scheme, a private encryption technique is further included to enhance the security by ciphering SSS metadata and also to verify the order of the nodes to be traversed in the path by stamping every packet at each host using private information or keys, as described below.

ii) Private Key Encryption for Order and Security: XOR and OTP

As abovementioned and further described before in the background of the invention, the enhanced version of SSS presented in the IETF draft has associated vulnerabilities that comes from exposing certain information plain and publicly. This information, if properly stored and analyzed, could be used to externally reproduced the SSS-based polynomials, by disclosing key information such as the prime number p and the lcc values. Actually, it has been shown in the background of the invention that the success of such attack does not depend on the secret polynomial proposed by the IETF draft, so it brings no additional security to the IETF solution. If those values are known by the attacker, any desired node of the path (or even the entire path, apart from the ingress and egress nodes) could be bypassed, making the scheme completely useless.

The present invention proposes to keep the important information that needs to be forwarded among the nodes, cmv and rps, confidential, so that attacks can be avoided and the composed scheme becomes robust. This is achieved by using existing secure solutions and techniques for key exchange, while not affecting in the performance of the related traffic flow. In this sense, the main required properties are:
Perform fast encryption (low computational complexity) within the nodes, to reduce any impact on the service's throughput.
Keep the proof-of-transit capabilities brought by SSS.
Increase the security by ciphering any critical data of the solution.
Have a pool of symmetric keys securely generated and stored for the different links of the node within the network.
Bring order to the solution.

Assuming an internal structure of modules for the node as shown in FIG. 2, the proposed enhancement to the modified SSS scheme comes within the logical steps performed by the second and fourth modules (B, D). Any packet traversing the OPoT path is stamped with a symmetric key using an XOR operation. This process is performed by the last module (D). The key association (key exchange technique, key consumption, refresh type and value, etc.) is defined during the OPoT deployment, and it is used whenever an incoming packet is matched by first module (A) of the node. This association could be also specified for the whole path, or even defined per link, depending on different security and LoA considerations. Together with the other OPoT values, any key association is established between every two nodes involved on each hop within the path. In this way, the cmv and rps values are hidden when leaving each node in the path through the egress last module (D) of the node, disclosed when entering the second module (B) of the subsequent node in the path and processed by the third module (C) of each node using the SSS technique. Therefore, any information gathered from the packet's metadata is not meaningful for the eavesdropper or attacker. Also, if the $rps_j$ values are truly random, keys could be reused in this scheme, as it could be seen as a new key ciphering of the same data (the keys on each hop). The encrypted $rps_j$ values could be reconstructed (but not disclosed) on each hop by listening two single packets, but the cmv values cannot be reconstructed, as they are not just modified by the XOR, but also by the Lagrange polynomial interpolation technique.

Finally, the described process also allows the verifier node to check if the packet has followed the correct order while traversing the path. In particular, the reconstruction process will fail if the order is not respected, as the deciphering process will produce invalid cmv and $rps_j$ values, and the interpolation (secret reconstruction) will finally generate a wrong verification value, dropping the packets.

Figure 3:
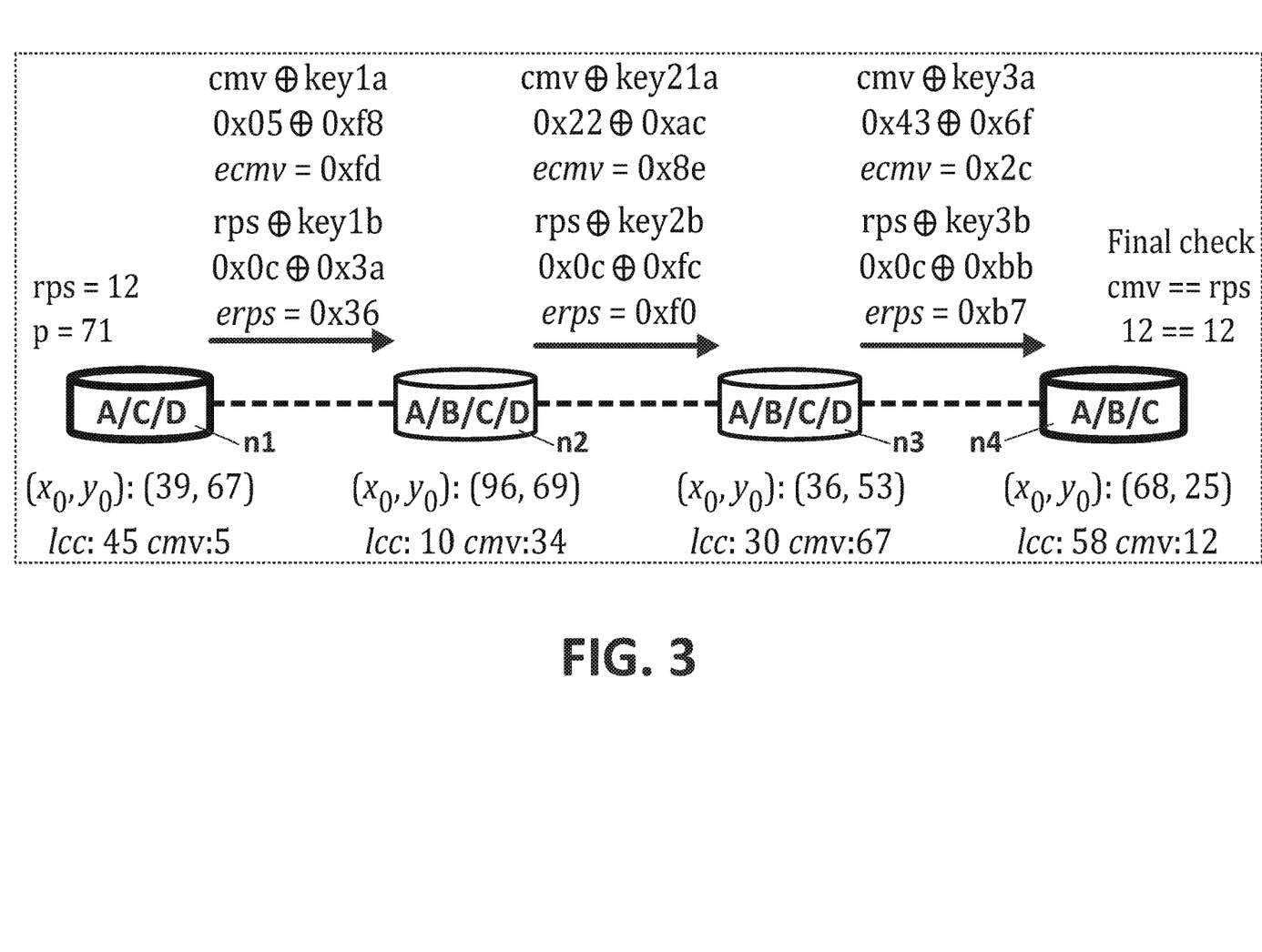
FIG. 3 shows a diagram of the OPoT execution for a given packet across the network nodes of a path, according to a possible embodiment of the invention.

As an example, in FIG. 3, which shows four nodes (n1, n2, n3, n4) with similar configuration as the one shown in FIG. 2 but adapted to the new scheme, if a packet leaving the ingress node (n1) goes to the third node (n3), bypassing one intermediate node (n2), the values used for the calculation will be a combination of cmv and $rps_j$, both XORed with the two intermediate (and different) keys used between the first and second nodes (n1, n2) and the second and third nodes (n2, n3). In the example of FIG. 3:

Prime number: p=71
Polynomial: $61x^3+55x^2+10x$ with no constant coefficient.
The nodes are given the values $\{x_i, y_i, lcc_i, p\}$
n1: {39, 59, 45, 71}
n2: {96, 61, 10, 71}
n3: {36, 45, 30, 71}
n4: {68, 17, 58, 71} with no verification value, as the transmitted $rps_j$ will be used for verification, for a given packet j.

In FIG. 3, ecmv and erps stand respectively for encrypted cmv and rps values. Any node shows the internal steps involved in the OPoT for this specific path. The ingress node (n1) generates the random value rps to be be used as the constant coefficient of the polynomial, which is the secret. This random value, e.g., rps=12, is transmitted with the packet and ciphered per hop. Each node in the path decrypts the OPoT metadata, reconstructs its part of the secret using its part of the share and the OPoT packet's metadata, ciphers the new values and transmits them to the subsequent node in the path. The top part of FIG. 3 shows the encryption of the OPoT metadata, while the bottom part shows each node's share and the generated cmv. The verification node (n4) finally checks if cmv==rps (in this case, succeeding 12==12), allowing the packet to be forwarded if the verification succeeds.

Therefore, the described OPoT process comprises:
the creation of the SSS scheme (avoiding the constant coefficient) by the central management system, e.g. SDN controller;
the creation of the n−1 (where n is the number of nodes included in the OPoT path) key exchange sessions for each hop, if there are not already in place;
for each packet, the generation of the random number (constant coefficient of the polynomial) by the ingress node;
the secret growing performed by each network node, together with the metadata encryption/decryption done after/prior processing;
the final decryption and scheme verification done by the egress (verifier) node.

Therefore, the described OPoT process allows:
To securely verify that certain traffic flow has traversed a set of nodes within a path.
To also check that said traffic has traversed the above-mentioned nodes in a certain predefined ordered.
To secure the related OPoT metadata by using low overhead encryption techniques, also providing order to the solution.
To provide different LoA for different services, either per link or per path, based on the source of the symmetric keys, refresh time for a given key, the amount of information to be ciphered, or other timestamping requirements.
To be easily integrated in modern network paradigms, such as SDN (for OPoT configuration) or NFV (for service chain security).

The OPoT process is a distributed method which is implemented involving every network node of the path or just a subset of nodes from the full set of multiple nodes defining the path in the network.

Note that in this text, the term "comprises" and its derivations (such as "comprising", etc.) should not be understood in an excluding sense, that is, these terms should not be interpreted as excluding the possibility that what is described and defined may include further elements, steps, etc.

What is claimed is:

1. A system for validating ordered proof of transit of network traffic comprising a plurality of network infrastructure nodes assignable to a path, the path starting from an ingress node and finishing at an egress node, in a network, each network infrastructure node comprising a set of input interfaces (20) for receiving at least a packet with a header containing metadata from a previous network infrastructure node within the path, wherein each network infrastructure node is configured to:
identify a matching route for the received packet with a routing table (23) and to identify proof of transit metadata in the header of the received packet;
if the matching route for the received packet is identified, and the packet contains proof of transit metadata, provide a first private key associated with the network infrastructure node and the previous network infrastructure node of the matching route in the path;
if the matching route for the received packet is identified and the identified matching route is associated with proof of transit metadata and proof of transit metadata is identified in the header of the received packet, decrypt the proof of transit metadata by using the first private key provided by the storing means (22) of the network infrastructure node; and
if the network infrastructure node is the ingress node, generate proof of transit metadata, which is included in the header of the received packet; and,
if the network infrastructure node is the egress node, validate if the packet has traversed the path by verifying the proof of transit metadata and, if so, remove all the proof of transit metadata from the header before forwarding the packet via a set of output interfaces (21) provided by the network infrastructure node, otherwise drop the packet; and
for any node, update the proof of transit metadata using unique information hosted per each node;
wherein the proof of transit metadata generated by the ingress node comprises a random polynomial secret and a cumulative verification value, and wherein egress node verifies the proof of transit metadata by comparing the cumulative verification value and the random polynomial secret, using Shamir's Secret Sharing scheme; and network infrastructure node different from the egress node updates the proof of transit metadata by updating the cumulative verification value using unique information, following Shamir's Secret Sharing scheme;

and each network infrastructure node different from the egress node is configured to re-encrypt the proof of transit metadata by using a second private key, before passing the packet with the header, the header including the re-encrypted proof of transit metadata, to a set of output interfaces (21), wherein the set of output interfaces (21) is provided by the network infrastructure node to forward the packet to a subsequent network infrastructure node of the matching route in the path and the storing means (22) of the network infrastructure node are further configured to provide the second private key associated with said network infrastructure node and the subsequent network infrastructure node of the matching route in the path;

wherein, if the order traversing the path is not respected, a first private key is used to decrypt the proof of transit metadata, which is different from the second key used by the previous node in the path to re-encrypt the proof of transit metadata, and a wrong cumulative verification value is generated.

2. The system according to claim 1, wherein the plurality of network infrastructure nodes for validating ordered proof of transit of network traffic is a subset of the full set of network infrastructure nodes from the ingress node to the egress node of the path.

3. A method for validating ordered proof of transit of network traffic through a path of multiple network infrastructure nodes starting from an ingress node and finishing at an egress node, the method comprising receiving at least a packet with a header containing metadata from a previous network infrastructure node within the path, characterized by further comprising:

generating, at the ingress node, proof of transit metadata to be included in the header of the received packet, wherein the generated proof of transit metadata comprises a random polynomial secret and a cumulative verification value;

identifying a matching route for the received packet with a routing table (23) and identifying proof of transit metadata in the header of the received packet;

if the matching route for the received packet is identified and, if the identified matching route is associated with proof of transit metadata and proof of transit metadata is identified in the header of the received packet, providing a first private key associated with the network infrastructure node and the previous network infrastructure node of the matching route in the path and decrypting the proof of transit metadata by using the provided first private key;

checking the cumulative verification value by using Shamir's Secret Sharing scheme to verify the proof of transit metadata the proof of transit metadata, updating the cumulative verification value by using unique information to update the proof of transit metadata following Shamir's Secret Sharing scheme, prior to forwarding the packet to the next node in the path;

updating the cumulative verification value by using unique information to update the proof of transit metadata following Shamir's Secret Sharing scheme, prior to forwarding the packet to the next node in the path;

updating the proof of transit metadata by each network infrastructure node;

re-encrypting the proof of transit metadata at a network infrastructure node which is not the egress node by using a second private key, before forwarding the packet with the header, the header including the re-encrypted proof of transit metadata, from the network infrastructure node to a subsequent network infrastructure node of the matching route in the path;

validating at the egress node if the packet has traversed the path by verifying the proof of transit metadata and, if so, removing all the proof of transit metadata from the header before forwarding the packet by the egress node, otherwise dropping the packet by the egress node; and if the order traversing the path is not respected, using a first private key to decrypt the proof of transit metadata, which is different from the second key used in the previous node in the path to re-encrypt the proof of transit metadata, and generating a wrong cumulative verification value.

4. The method according to claim 3, running in at least a subset of nodes from the set of multiple network infrastructure nodes of the path.

* * * * *